United States Patent
Pareek

(10) Patent No.: US 12,174,837 B2
(45) Date of Patent: Dec. 24, 2024

(54) SYSTEM AND METHOD FOR INTEGRATION OF USER DEFINED METRICS OF CLOUD HOSTED RELATIONAL DATABASES WITH CLOUD MONITORING SERVICES

(71) Applicant: JPMorgan Chase Bank, N.A., New York, NY (US)

(72) Inventor: Ashutosh Pareek, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/195,639

(22) Filed: May 10, 2023

(65) Prior Publication Data

US 2024/0330306 A1 Oct. 3, 2024

(30) Foreign Application Priority Data

Mar. 28, 2023 (IN) .............................. 202311022690

(51) Int. Cl.
*G06F 17/30* (2006.01)
*G06F 11/34* (2006.01)
*G06F 16/2457* (2019.01)
*G06F 16/28* (2019.01)

(52) U.S. Cl.
CPC .... *G06F 16/24573* (2019.01); *G06F 11/3409* (2013.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 10,833,960 B1* | 11/2020 | Ranchal | ............... | G06Q 20/382 |
| 11,546,219 B1* | 1/2023 | Groenewald | ....... | H04L 41/5048 |
| 11,615,328 B2* | 3/2023 | Maeser | ................. | G06N 20/00 |
| | | | | 706/12 |
| 2014/0380175 A1* | 12/2014 | Matczynski | ........ | G06F 9/45558 |
| | | | | 709/226 |
| 2017/0177895 A1* | 6/2017 | McHale | ............... | G06F 21/6218 |
| 2017/0257289 A1* | 9/2017 | Cui | ......................... | H04L 43/20 |
| 2018/0095778 A1* | 4/2018 | Aydelott | ............ | G06Q 10/0637 |
| 2019/0158361 A1* | 5/2019 | Blasi | ..................... | H04L 43/065 |

(Continued)

*Primary Examiner* — Hung D Le
(74) *Attorney, Agent, or Firm* — GREENBLUM & BERNSTEIN, P.L.C.

(57) ABSTRACT

Various methods, apparatuses/systems, and media for integration of user defined metrics of cloud hosted relational databases with cloud monitoring services are disclosed. A processor receives via a serverless function implemented within the processor a configuration file containing configuration of collection of database connection string and respective metrics query. The serverless function connects to the secrets provider to fetch a password or authorization token to connect with a plurality of different types of cloud hosted relational databases. The processor returns, in response to receiving the respective metrics query, a table with two columns where one column includes a user defined metric name and the other column includes the metric query to fetch a user defined metric value for the given user defined metric name from the databases; and automatically integrates the fetched user defined metric value of the databases with the cloud monitoring service.

20 Claims, 6 Drawing Sheets

(56) References Cited

U.S. PATENT DOCUMENTS

| | | | | |
|---|---|---|---|---|
| 2020/0242532 A1* | 7/2020 | Kawamoto | ...... | G06Q 10/06393 |
| 2020/0388403 A1* | 12/2020 | Boulos | ...... | G16H 50/20 |
| 2020/0412625 A1* | 12/2020 | Bagarolo | ...... | H04L 43/0805 |
| 2021/0306419 A1* | 9/2021 | Lamba | ...... | G06F 16/182 |
| 2021/0306431 A1* | 9/2021 | Giannetti | ...... | H04L 67/51 |
| 2021/0334107 A1* | 10/2021 | Yosef | ...... | G06F 9/445 |
| 2022/0182333 A1* | 6/2022 | Nevrekar | ...... | G06F 16/14 |
| 2022/0383150 A1* | 12/2022 | Le | ...... | G06N 20/00 |
| 2023/0305944 A1* | 9/2023 | Biswas | ...... | G06F 11/3612 |
| 2023/0368262 A1* | 11/2023 | Kumar | ...... | G06Q 30/0629 |
| 2024/0007492 A1* | 1/2024 | Shen | ...... | H04L 63/1425 |
| 2024/0028374 A1* | 1/2024 | Singh | ...... | G06F 11/3006 |

* cited by examiner

SYSTEM AND METHOD FOR INTEGRATION OF USER DEFINED METRICS OF CLOUD HOSTED RELATIONAL DATABASES WITH CLOUD MONITORING SERVICES

CROSS-REFERENCE TO RELATED APPLICATIONS

This application claims the benefit of priority from Indian patent application Ser. No. 2023/11022690, filed Mar. 28, 2023, which is herein incorporated by reference in its entirety.

TECHNICAL FIELD

This disclosure generally relates to data management, and more particularly, to methods and apparatuses for implementing a platform, language, cloud, and database agnostic user defined metrics integration module configured for integration of user defined metrics of cloud hosted relational databases with cloud monitoring services.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, cloud monitoring services, performance analysis, project tracking, data management, and competitive analysis, to name but a few.

Metrics, in analogy with human health metrics such as Body Mass Index (BMI), sugar level, blood pressure, heart rate, etc., which may provide information about a human body, software may also have system level metrics such as CPU usages, memory usages, etc., along with business level metrics like number of trades in a day, number of orders etc.

In general, databases may store sets of data that can be queried for use in other applications. Just like blood may be considered the most important part of a human body where many human metrics are sourced from, databases may also be considered the most important part of any software where metrics from these databases may give most of the information about software. A database management system may typically support the development, administration, and use of database platforms. A Relational Database Management System (RDBMS) may be a type of database management system that may store data in a row-based table structure which may connect related data elements. An RDBMS may include functions that may maintain the security, accuracy, integrity, and consistency of the data corresponding to the software.

Moreover, in analogy with a pathology lab report about a blood test that may provide health metrics, software must send their metrics to a cloud monitoring service which may show those metrics to users and allow users put alarm and alerts on it. These alerts may trigger email and SMS to users or can be configured to take corrective actions. Example of cloud monitoring services may include AWS Cloudwatch for AWS, Azure Monitor for Azure etc. For example, Cloudwatch monitoring service may be utilized for monitoring the applications or other services. Traditionally, this monitoring may be done on metric value and alarms may be setup which may execute various functions such as sending email to production support teams if metric value breaches configured threshold.

Typically, cloud hosted databases by default may send certain metrics to monitoring service and a user may have no control if they want to add more metrics to it. That is, cloud monitoring service may only receive database metrics defined by a cloud provider for that database provider. And, therefore, there may be no way to send custom metrics (i.e., user defined metrics) from a cloud hosted database in their monitoring services and a user may only have information of database based on the metrics which are provided by default from the cloud providers. For example, if a user wants to put monitoring on number of blocked sessions for RDS Oracle (AWS hosted Database), the user can't do this task as it is not provided by default by AWS. There is no provision for pushing application/business specific metrics (such as number of orders place, number of logged in users in an application, etc.) from database table data.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic user defined metrics integration module configured for integration of user defined metrics of cloud hosted relational databases with cloud monitoring services, but the disclosure is not limited thereto.

For example, the present disclosure, through one or more of its various aspects, embodiments, and/or specific features or sub-components, provides, among other features, various systems, servers, devices, methods, media, programs, and platforms for implementing a platform, language, database, and cloud agnostic user defined metrics integration module configured to: send user defined metrics for a cloud hosted relational database in a database engine/provider agnostic manner such that it can work for any relational database engine; implement one serverless function to fetch metrics of all relational databases within a given cloud account; mitigate the dependency of application teams from cloud provider for relational database metrics monitoring via cloud monitoring services, but the disclosure is not limited thereto.

According to exemplary embodiments, the user defined metrics integration module can be configured to be cloud provider agnostic such that the services utilized by user defined metrics integration module can be deployed in any cloud provider regardless of the types of the cloud providers. Moreover, the solution implemented by user defined metrics integration module may prove to be cost effective as it implements serverless function (i.e., a user only pays for amount of resources the user uses) to run the code which fetches the metric values and sends the metric values to the cloud monitoring service. For example, the user defined metrics integration module as disclosed herein may be configured to implement a lambda function to run code where infrastructure is managed by a cloud provider and a user may only be charged for an amount of resource used. In addition, the user defined metrics integration module as disclosed herein may be configured to implement a rule that may trigger the lambda function periodically after configured amount of time.

According to exemplary embodiments, a method for integrating user defined metrics of cloud hosted relational databases with cloud monitoring services by utilizing one or more processors along with allocated memory is disclosed. The method may include: establishing a communication link, via a communication network, among a cloud monitoring service, secrets provider, at least one processor configured to implement a serverless function, and a plurality of cloud hosted relational databases: implementing said at least one processor between the cloud monitoring service and the plurality of relational databases: receiving by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases; returning, in response to receiving the respective metrics query, a table with two columns where one column includes a user defined metric name and the other column includes the metric query to fetch a user defined metric value for the given user defined metric name from the plurality of cloud hosted relational databases: executing, by the serverless function implemented within said at least one processor, the configurable metric query for each connection string to obtain corresponding user defined metric value from the plurality of cloud hosted relational databases; and automatically integrating the user defined metric value of the plurality of cloud hosted relational databases with the cloud monitoring service.

According to exemplary embodiments, said cloud hosted relational databases may be of different types supported by different cloud providers.

According to exemplary embodiments, the user defined metrics may be cloud agnostic such that the serverless function sends the user defined metrics for a cloud hosted relational database among the plurality of cloud hosted relational databases to the cloud monitoring servicer in a database engine or provider agnostic manner such that user defined metrics can be implemented for any relational database engine or provider.

According to exemplary embodiments, the method may further include: implementing only one serverless function to fetch metrics of all relational databases within a given cloud account thereby mitigating dependency of application teams from cloud provider for relational database metrics monitoring via the cloud monitoring service.

According to exemplary embodiments, the serverless function may be a function that is configurable to run the codes of the configuration file to fetch the user defined metric values from the plurality of relational databases and transmit the metric values to the cloud monitoring service in a manner such that a user of the serverless function is only charged for an amount of resources of the plurality of relational databases the user utilizes in fetching the user defined metric values and for an amount of time for which the amount of resources are consumed.

According to exemplary embodiments, the serverless function may implement a lambda function to run the codes of the configuration file where infrastructure is managed by a cloud provider and the user is only be charged for an amount (i.e., dollar amount) of resources used.

According to exemplary embodiments, the method may further include: implementing a rule that triggers the lambda function periodically after configured amount of time.

According to exemplary embodiments, a system for integrating user defined metrics of cloud hosted relational databases with cloud monitoring services is disclosed. The system may include: a processor; and a memory operatively connected to the processor via a communication interface, the memory storing computer readable instructions, when executed, may cause the processor to: establish a communication link, via a communication network, among a cloud monitoring service, secrets provider, at least one processor configured to implement a serverless function, and a plurality of cloud hosted relational databases; implement said at least one processor between the cloud monitoring service and the plurality of relational databases; receive by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases; return, in response to receiving the respective metrics query, a table with two columns where one column includes a user defined metric name and the other column includes the configurable metric query to fetch a user defined metric value for the given user defined metric name from the plurality of cloud hosted relational databases; execute, by the serverless function implemented within said at least one processor, the metric query for each connection string to obtain corresponding user defined metric value from the plurality of cloud hosted relational databases; and automatically integrate the user defined metric value of the plurality of cloud hosted relational databases with the cloud monitoring service.

According to exemplary embodiments, the processor may be further configured to: implement only one serverless function to fetch metrics of all relational databases within a given cloud account thereby mitigating dependency of application teams from cloud provider for relational database metrics monitoring via the cloud monitoring service.

According to exemplary embodiments, the processor may be further configured to: implement a rule that triggers the lambda function periodically after configured amount of time.

According to exemplary embodiments, a non-transitory computer readable medium configured to store instructions for integrating user defined metrics of cloud hosted relational databases with cloud monitoring services is disclosed. The instructions, when executed, may cause a processor to perform the following: establishing a communication link, via a communication network, among a cloud monitoring service, secrets provider, at least one processor configured to implement a serverless function, and a plurality of cloud hosted relational databases: implementing said at least one processor between the cloud monitoring service and the plurality of relational databases: receiving by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases; returning, in response to receiving the respective metrics query, a table with two columns where one column includes a user defined metric name and the other column includes the metric query to fetch a user defined metric value for the given user defined metric name from the plurality of cloud hosted relational databases: executing, by the serverless function implemented within said at least one processor, the configurable metric query for each connection string to obtain corresponding user defined metric value from the plurality of cloud hosted relational databases; and automatically integrating the user defined metric value of the plurality of cloud hosted relational databases with the cloud monitoring service.

According to exemplary embodiments, the instructions, when executed, may cause the processor to further perform the following: implementing only one serverless function to fetch metrics of all relational databases within a given cloud account thereby mitigating dependency of application teams from cloud provider for relational database metrics monitoring via the cloud monitoring service.

According to exemplary embodiments, the instructions, when executed, may cause the processor to further perform the following: implementing a rule that triggers the lambda function periodically after configured amount of time.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
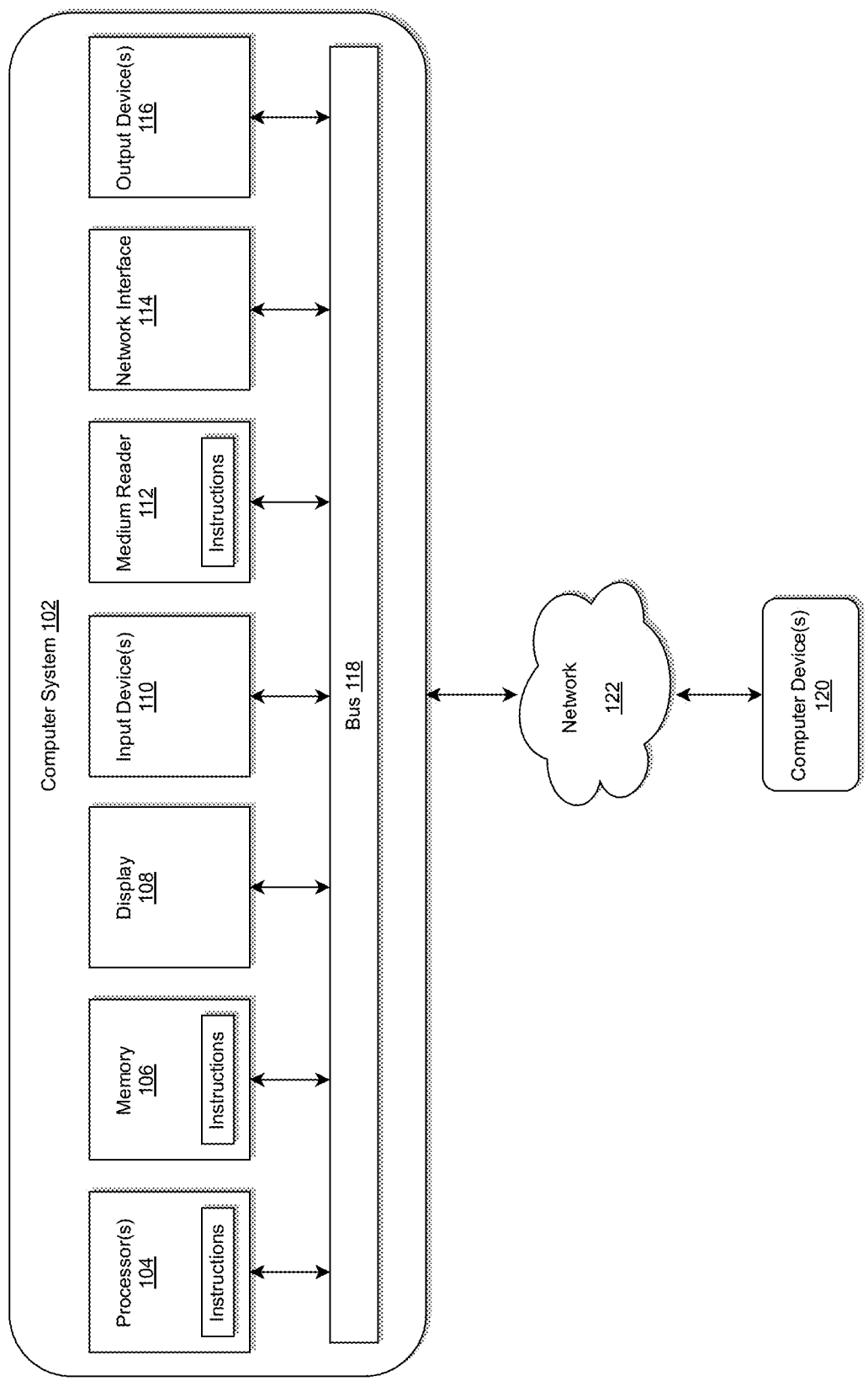
FIG. 1 illustrates a computer system for implementing a platform, language, database, and cloud agnostic query generating module configured to generate platform and database agnostic user defined metrics integration module configured for integration of user defined metrics of cloud hosted relational databases with cloud monitoring services in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic user defined metrics integration module configured for integration of user defined metrics of cloud hosted relational databases with cloud monitoring services in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the user defined metrics integration module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the user defined metrics integration module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
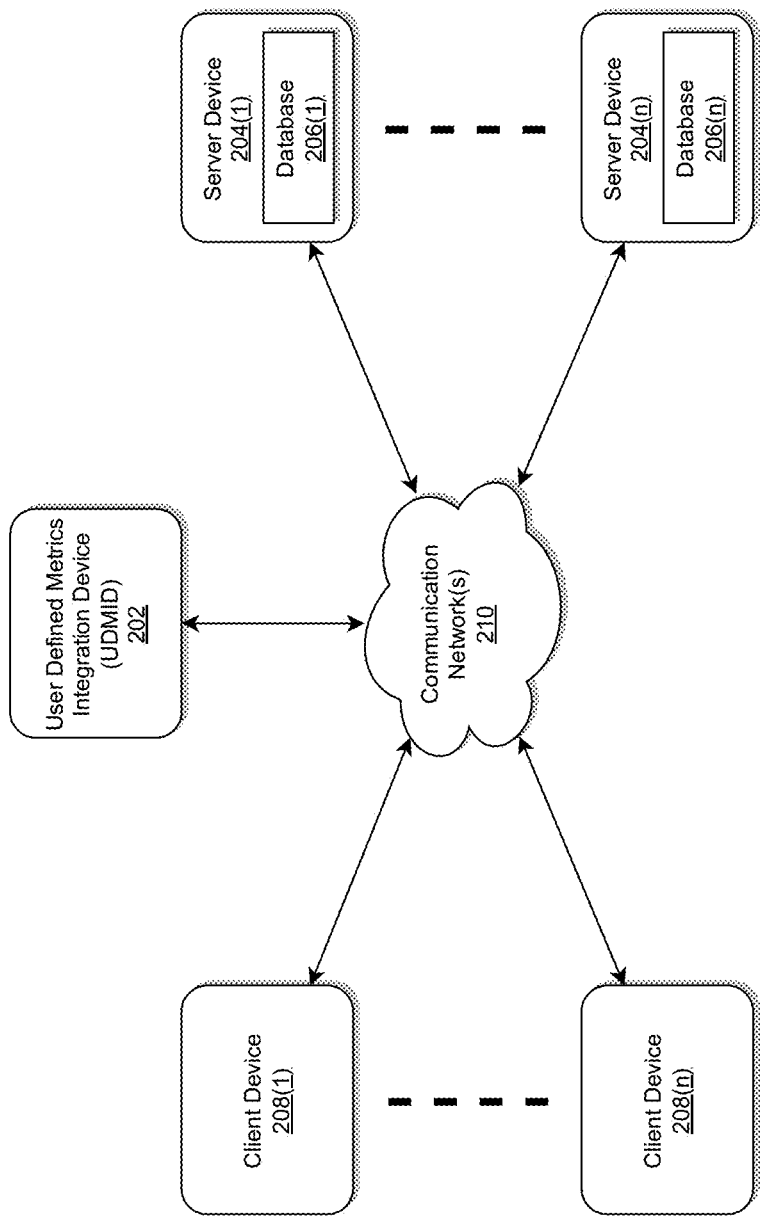
FIG. 2 illustrates an exemplary diagram of a network environment with a platform, language, database, and cloud agnostic user defined metrics integration device in accordance with an exemplary embodiment.

Referring to FIG. 2, a schematic of an exemplary network environment 200 for implementing a language, platform, database, and cloud agnostic user defined metrics integration device (UDMID) of the instant disclosure is illustrated.

According to exemplary embodiments, the above-described problems associated with conventional tools may be overcome by implementing an UDMID 202 as illustrated in FIG. 2 that may be configured for implementing a platform, language, database, and cloud agnostic user defined metrics integration module configured to integrate user defined metrics of cloud hosted relational databases with cloud monitoring services, but the disclosure is not limited thereto. For example, the above-described problems associated with conventional tools may be overcome by implementing the UDMID 202 as illustrated in FIG. 2 that may be configured to send user defined metrics for a cloud hosted relational database in a database engine/provider agnostic manner such that it can work for any relational database engine; implement one serverless function to fetch metrics of all relational databases within a given cloud account; mitigate the dependency of application teams from cloud provider for relational database metrics monitoring via cloud monitoring services, but the disclosure is not limited thereto.

The UDMID 202 may be the same or similar to the computer system 102 as described with respect to FIG. 1.

The UDMID 202 may store one or more applications that can include executable instructions that, when executed by the UDMID 202, cause the UDMID 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the UDMID 202 itself, may be located in virtual server(s) running in a cloud-based computing environment rather than being tied to one or more specific physical network computing devices. Also, the application(s) may be running in one or more virtual machines (VMs) executing on the UDMID 202. Additionally, in one or more embodiments of this technology, virtual machine(s) running on the UDMID 202 may be managed or supervised by a hypervisor.

In the network environment 200 of FIG. 2, the UDMID 202 is coupled to a plurality of server devices 204(1)-204 (n) that hosts a plurality of databases 206(1)-206 (n), and also to a plurality of client devices 208(1)-208 (n) via communication network(s) 210. A communication interface of the UDMID 202, such as the network interface 114 of the computer system 102 of FIG. 1, operatively couples and communicates between the UDMID 202, the server devices 204(1)-204 (n), and/or the client devices 208(1)-208 (n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the UDMID 202, the server devices 204(1)-204 (n), and/or the client devices 208(1)-208 (n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UDMID 202 may be a standalone device or integrated with one or more other devices or apparatuses, such as one or more of the server devices 204(1)-204 (n), for example. In one particular example, the UDMID 202 may be hosted by one of the server devices 204(1)-204 (n), and other arrangements are also possible. Moreover, one or more of the devices of the UDMID 202 may be in the same or a different communication network including one or more public, private, or cloud networks, for example.

The plurality of server devices 204(1)-204 (*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204 (*n*) in this example may process requests received from the UDMID 202 via the communication network(s) 210 according to the HTTP-based and/or JavaScript Object Notation (JSON) protocol, for example, although other protocols may also be used.

The server devices 204(1)-204 (*n*) may be hardware or software or may represent a system with multiple servers in a pool, which may include internal or external networks. The server devices 204(1)-204 (*n*) hosts the databases 206(1)-206 (*n*) that are configured to store metadata sets, data quality rules, and newly generated data.

Although the server devices 204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204 (1)-204 (*n*) may contain a plurality of network computing devices that operate using a master/slave approach, whereby one of the network computing devices of the server devices 204(1)-204 (*n*) operates to manage and/or otherwise coordinate operations of the other network computing devices.

The server devices 204(1)-204 (*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204 (*n*) or other client devices 208(1)-208 (*n*).

According to exemplary embodiments, the client devices 208(1)-208 (*n*) in this example may include any type of computing device that can facilitate the implementation of the UDMID 202 that may efficiently provide a platform for implementing a platform, language, database, and cloud agnostic user defined metrics integration module configured to integrate user defined metrics of cloud hosted relational databases with cloud monitoring services, but the disclosure is not limited thereto. For example, according to exemplary embodiments, the client devices 208(1)-208 (*n*) in this example may include any type of computing device that can facilitate the implementation of the UDMID 202 that may efficiently provide a platform for implementing a platform, language, database, and cloud agnostic user defined metrics integration module configured to send user defined metrics for a cloud hosted relational database in a database engine/ provider agnostic manner such that it can work for any relational database engine: implement one serverless function to fetch metrics of all relational databases within a given cloud account: mitigate the dependency of application teams from cloud provider for relational database metrics monitoring via cloud monitoring services, but the disclosure is not limited thereto.

The client devices 208(1)-208 (*n*) may run interface applications, such as standard web browsers or standalone client applications, which may provide an interface to communicate with the UDMID 202 via the communication network(s) 210 in order to communicate user requests. The client devices 208(1)-208 (*n*) may further include, among other features, a display device, such as a display screen or touchscreen, and/or an input device, such as a keyboard, for example.

Although the exemplary network environment 200 with the UDMID 202, the server devices 204(1)-204 (*n*), the client devices 208(1)-208 (*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the UDMID 202, the server devices 204(1)-204 (*n*), or the client devices 208(1)-208 (*n*), for example, may be configured to operate as virtual instances on the same physical machine. For example, one or more of the UDMID 202, the server devices 204(1)-204 (*n*), or the client devices 208(1)-208 (*n*) may operate on the same physical device rather than as separate devices communicating through communication network(s) 210. Additionally, there may be more or fewer UDMIDs 202, server devices 204(1)-204 (*n*), or client devices 208(1)-208 (*n*) than illustrated in FIG. 2. According to exemplary embodiments, the UDMID 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
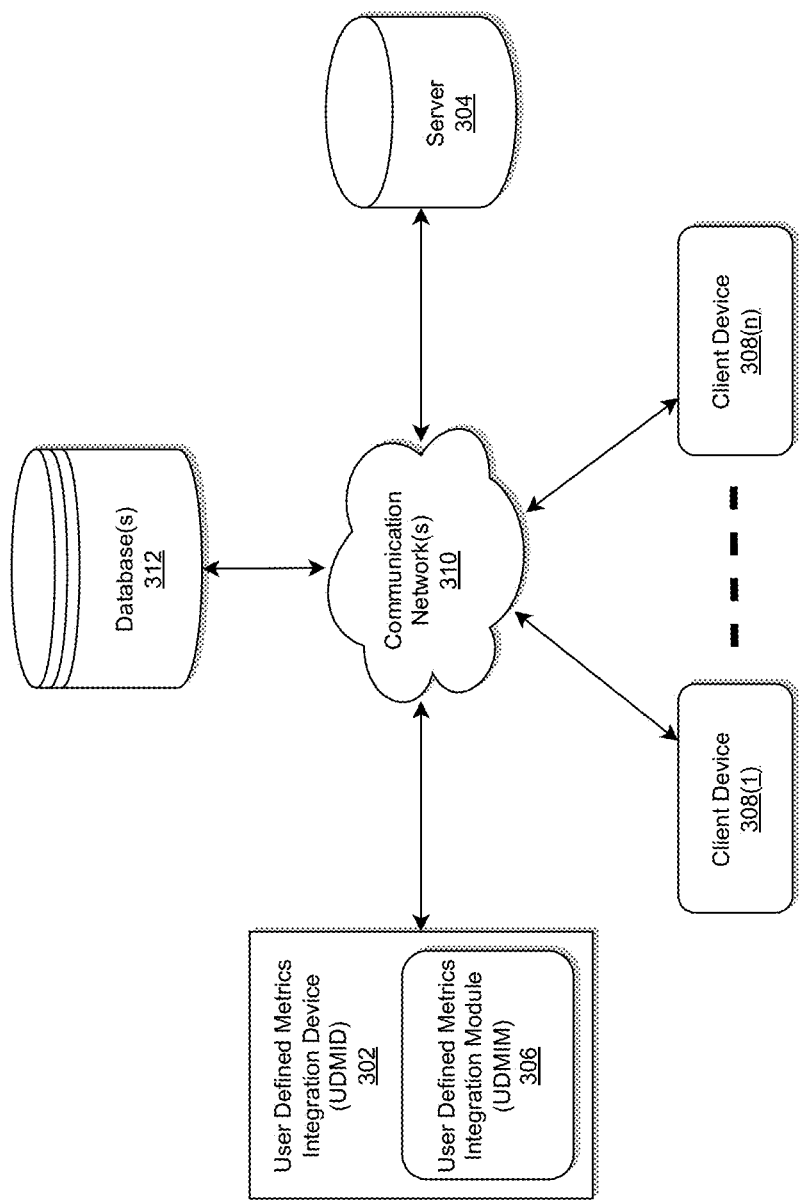
FIG. 3 illustrates a system diagram for implementing a platform, language, database, and cloud agnostic user defined metrics integration device having a platform, language, database, and cloud agnostic user defined metrics integration module in accordance with an exemplary embodiment.

FIG. 3 illustrates a system diagram for implementing a platform, language, and cloud agnostic UDMID having a platform, language, database, and cloud agnostic user defined metrics integration module (UDMIM) in accordance with an exemplary embodiment.

As illustrated in FIG. 3, the system 300 may include a UDMID 302 within which an UDMIM 306 is embedded, a server 304, a database(s) 312, a plurality of client devices 308(1) . . . 308 (*n*), and a communication network 310.

According to exemplary embodiments, the UDMID 302 including the UDMIM 306 may be connected to the server 304, and the database(s) 312 via the communication network 310. The UDMID 302 may also be connected to the plurality of client devices 308(1) . . . 308 (n) via the communication network 310, but the disclosure is not limited thereto.

According to exemplary embodiment, the UDMID 302 is described and shown in FIG. 3 as including the UDMIM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the UDMIM 306 may be configured to receive real-time feed of data from the plurality of client devices 308(1) . . . 308 (n) and secondary sources via the communication network 310.

As may be described below, the UDMIM 306 may be configured to: implement an object relational model to build a system as a query generator, wherein the query generator is written in a preconfigured language: cause the query generator to: establish a communication link, via a communication network, among a cloud monitoring service, secrets provider, at least one processor configured to implement a serverless function, and a plurality of cloud hosted relational databases: implement said at least one processor between the cloud monitoring service and the plurality of relational databases: receive by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases; return, in response to receiving the respective metrics query, a table with two columns where one column includes a user defined metric name and the other column includes the metric query to fetch a user defined metric value for the given user defined metric name from the plurality of cloud hosted relational databases: execute, by the serverless function implemented within said at least one processor, the configurable metric query for each connection string to obtain corresponding user defined metric value from the plurality of cloud hosted relational databases; and automatically integrate the user defined metric value of the plurality of cloud hosted relational databases with the cloud monitoring service, but the disclosure is not limited thereto.

The plurality of client devices 308(1) . . . 308 (n) are illustrated as being in communication with the UDMID 302. In this regard, the plurality of client devices 308(1) . . . 308 (n) may be "clients" (e.g., customers) of the UDMID 302 and are described herein as such. Nevertheless, it is to be known and understood that the plurality of client devices 308(1) . . . 308 (n) need not necessarily be "clients" of the UDMID 302, or any entity described in association therewith herein. Any additional or alternative relationship may exist between either or both of the plurality of client devices 308(1) . . . 308 (n) and the UDMID 302, or no relationship may exist.

The first client device 308(1) may be, for example, a smart phone. Of course, the first client device 308(1) may be any additional device described herein. The second client device 308 (n) may be, for example, a personal computer (PC). Of course, the second client device 308 (n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308 (n) may communicate with the UDMID 302 via broadband or cellular communication. Of course, these embodiments are merely exemplary and are not limiting or exhaustive.

The computing device 301 may be the same or similar to any one of the client devices 208(1)-208 (n) as described with respect to FIG. 2, including any features or combination of features described with respect thereto. The UDMID 302 may be the same or similar to the UDMID 202 as described with respect to FIG. 2, including any features or combination of features described with respect thereto.

Figure 4:
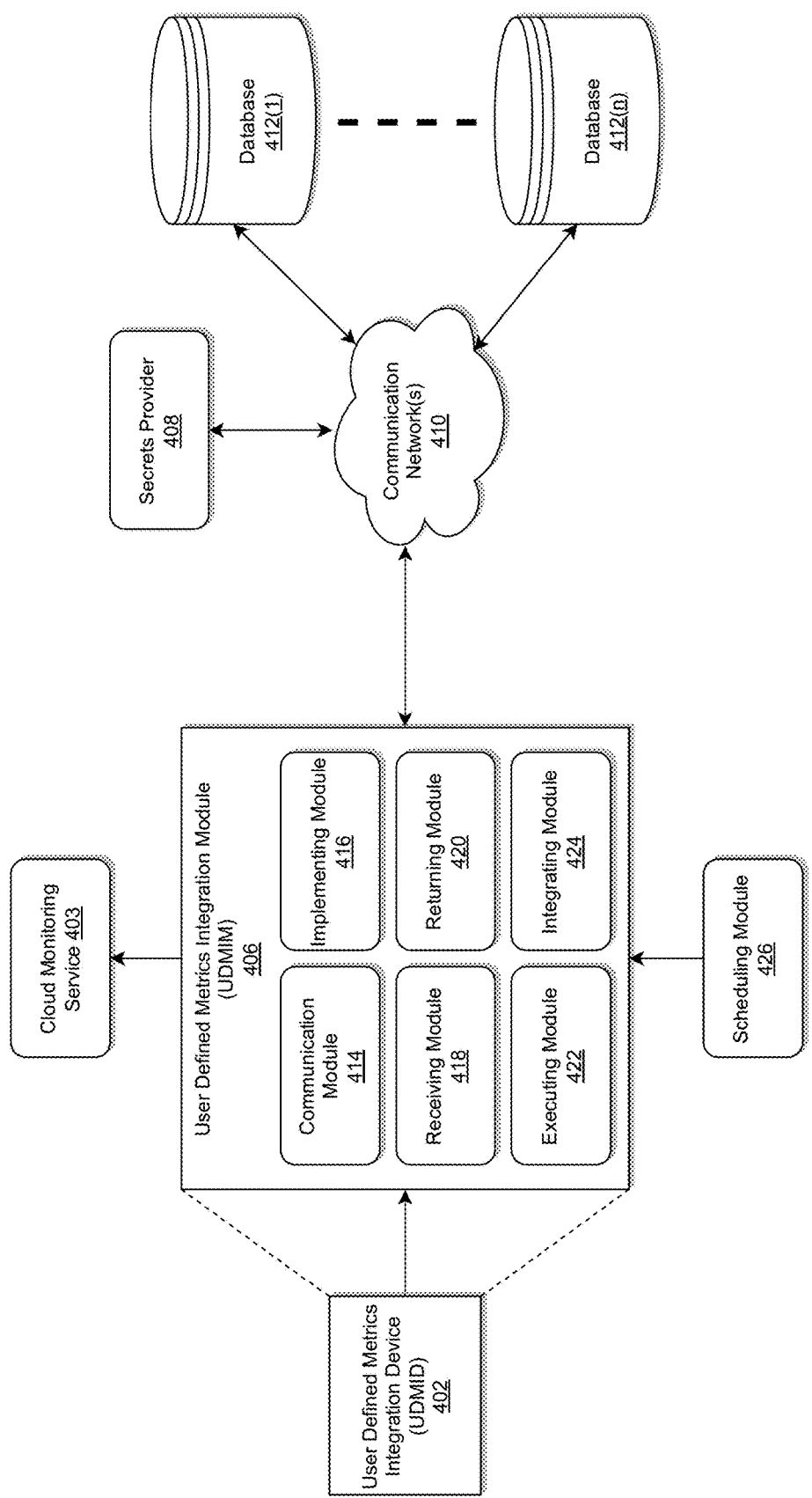
FIG. 4 illustrates a system diagram for implementing a platform, language, database, and cloud agnostic user defined metrics integration module of FIG. 3 in accordance with an exemplary embodiment.

FIG. 4 illustrates a system diagram for implementing a platform, language, database, and cloud agnostic UDMIM of FIG. 3 in accordance with an exemplary embodiment.

According to exemplary embodiments, the system 400 may include a platform, language, database, and cloud agnostic UDMID 402 within which a platform, language, database, and cloud agnostic UDMIM 406 is embedded, database 412(1)-412 (n), cloud monitoring service 403, a secrets provider 408, a scheduling module 426, and a communication network 410. The database 412(1)-412 (n) may be any types of RDMBSs. For example, RDBMSs may include MySQL, PostgreSQL, MariaDB, Microsoft SQL Server, Amazon Aurora, and Oracle Database, etc.

According to exemplary embodiments, the UDMID 402 including the UDMIM 406 may be connected to the secrets provider 408 (see, also, FIG. 5, cloud secrets provider 508) to fetch the password or authentication token for database 412(1)-412 (n) before connecting to the database 412(1)-412 (n).

According to exemplary embodiments, as illustrated in FIG. 4, the UDMIM 406 may include a communication module 414, an implementing module 416, a receiving module 418, a returning module 420, an executing module 422, and an integrating module 424.

According to exemplary embodiments, each of the communication module 414, the implementing module 416, the receiving module 418, the returning module 420, the executing module 422, and the integrating module 424 of the UDMIM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the communication module 414, the implementing module 416, the receiving module 418, the returning module 420, the executing module 422, and the integrating module 424 of the UDMIM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the communication module 414, the implementing module 416, the receiving module 418, the returning module 420, the executing module 422, and the integrating module 424 of the UDMIM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the communication module 414, the implementing module 416, the receiving module 418, the returning module 420, the executing module 422, and the integrating module 424 of the UDMIM 406 of FIG. 4 may be called via corresponding API.

According to exemplary embodiments, the process implemented by the UDMIM 406 may be executed via the communication module 414 and the communication network 410, which may comprise plural networks as described above. For example, in an exemplary embodiment, the various components of the UDMIM 406 may communicate with the secrets provider 408 (see, also, FIG. 5, cloud secrets provider 508), cloud monitoring service 403, and the database 412(1)-412 (n) via the communication module 414 and the communication network 410. Of course, these embodiments are merely exemplary and are not limiting or exhaustive. The database 412(1)-412 (n) may include the databases included within the private cloud and/or public cloud and the server 404 may include one or more servers within the private cloud and the public cloud.

Figure 5:
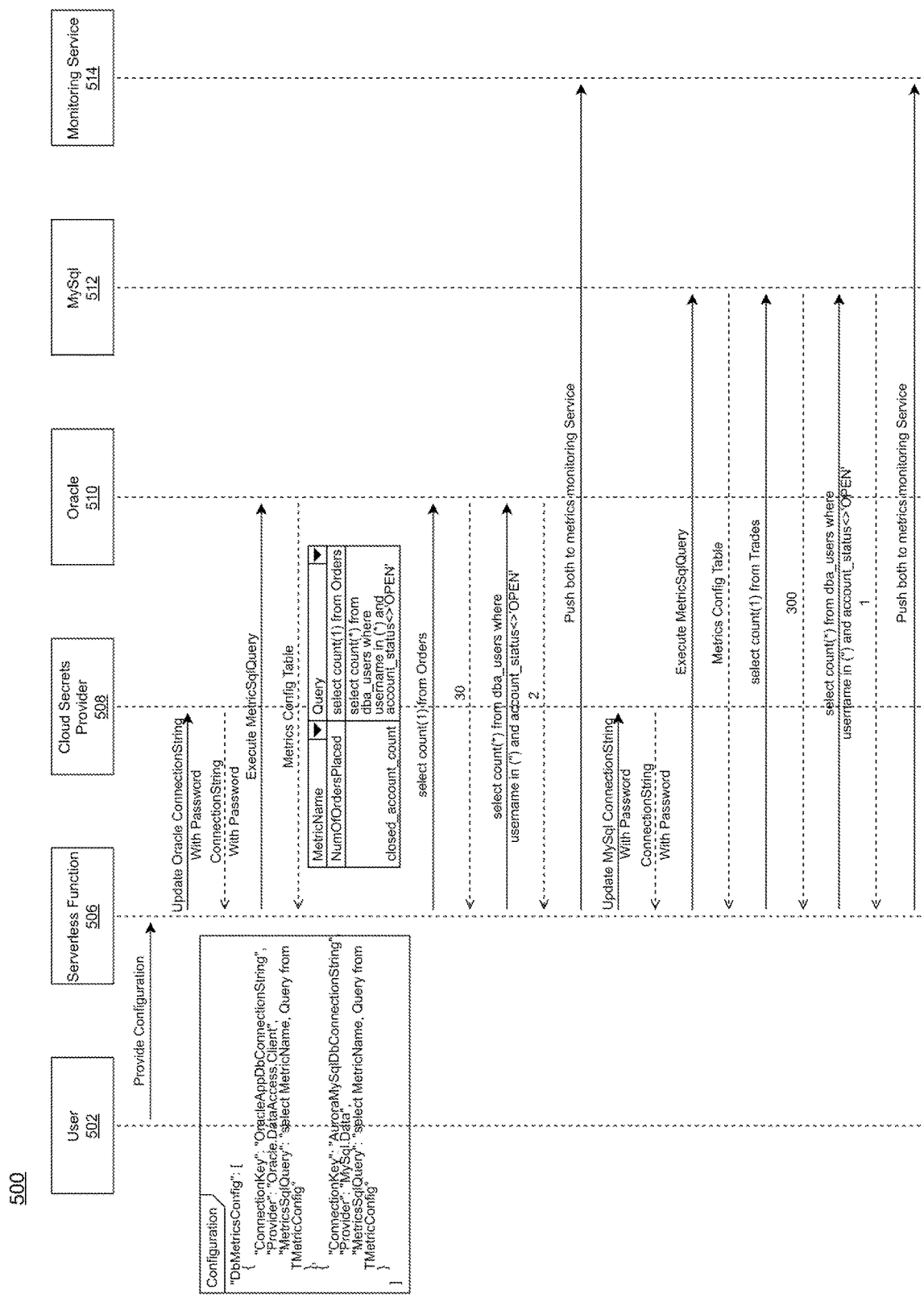
FIG. 5 illustrates an exemplary sequence diagram as implemented by the platform, language, database, and cloud agnostic user defined metrics integration module of FIG. 4 in accordance with an exemplary embodiment.

FIG. 5 illustrates an exemplary sequence diagram 500 as implemented by the platform, language, database, and cloud agnostic UDMIM 406 of FIG. 4 in accordance with an exemplary embodiment. The exemplary sequence diagram 500 of FIG. 5 may include a serverless function 506 implemented by a processor (i.e., processor 104 as illustrated in FIG. 1) within the UDMIM 406, a cloud secrets provider 508, an Oracle database 510 (may also be referred to as database engine, or simply Oracle), a MySql database 512 (or simply MySql), and a monitoring service 514. Oracle database 510 and MySql databased 512 have been utilized therein for exemplary purposes. Any types of relational databased may be utilized without departing from the scope of the present disclosure.

According to exemplary embodiments, interactions and data exchange among these modules included in the UDMIM 406 provide the advantageous effects of the disclosed invention. Functionalities of each module of FIG. 4 may be described in detail below with reference to FIGS. 4-5.

According to exemplary embodiments, the scheduling module 426 may be a scheduler for serverless function 506. For example, the scheduling module 426 may be configured to schedule service provided by the cloud providers to schedule execution of serverless functions. For example, In AWS this service is known as Aws event bridge and in Azure its known as Time Trigger for Azure function. Although these service makes scheduling easy and recommended to use but not necessarily required. User can implement its manual scheduler module which have logic to invoke serverless function based on configured time period. Users (i.e., user 502) who set up and maintain software environments within the communication network 410 may utilize the scheduling module 426 to schedule jobs to run periodically at fixed times, dates, or intervals for the processes as disclosed herein with reference to FIGS. 4-5.

Referring to FIGS. 4-5, according to exemplary embodiments, the communication module 414 may be configured to establish a communication link, via the communication network 410, among a cloud monitoring service 403 (or the monitoring service 514), a cloud secrets provider 508, at least one processor (i.e., a processor embedded within the UDMIM 406) configured to implement a serverless function 506, and a plurality of cloud hosted relational databases, i.e., 412(1)-412 (n) (or Oracle database 510, MySql database 512). The processor embedded within the UDMIM 406 may be the same or similar to the processor 104 as illustrated in FIG. 1.

According to exemplary embodiments, the implementing module 416 may be configured to implement the at least one processor between the cloud monitoring service 403 (or the monitoring service 514), and the plurality of relational databases 412(1)-412 (n) (or Oracle database 510, MySql database 512).

According to exemplary embodiments, the receiving module 418 may be configured to receive by the serverless function 506 implemented within the processor 104 a configuration file via the communication network 410. The configuration file may contain configuration of collection of database connection string and respective metrics query, wherein the serverless function connects to the cloud secrets provider 508 to fetch a password or authorization token to connect with the databases 412(1)-412 (n). An exemplary configuration file may include the following:

"DbMetricsCOnfig": [
{
"ConnectionKey": "OracleAppDbConnectionString",
"Provider": "Oracle.DataAccess.Client",
"MetricsSqlQuery": "select MetricName, Query from TMetricConfig"
},
{
"ConnectionKey": "AuroraMySqlDbConnectionString",
"Provider": "MySql.Data",
"MetricsSqlQuery": "select MetricName, Query from TMetricConfig"
}
]

According to exemplary embodiments, the returning module 420 may be configured to return, in response to receiving the configurable metric query, a table with two columns where one column includes a user defined metric name and the other column includes the configurable metric query to fetch a user defined metric value for the given user defined metric name from the plurality of cloud hosted relational databases. An exemplary table may include TABLE 1 as follows:

TABLE 1

| MetricName | Query |
| --- | --- |
| NumOfOrdersPlaced | select count(1) from Orders |
| closed_account_count | select count(*) from dba_users where username in (*) and account_status< >'OPEN' |

According to exemplary embodiments, the executing module 422 may be configured to execute, by the serverless function 506 implemented within said at least one processor 104, the configurable metric query for each connection string to obtain corresponding user defined metric value from the plurality of cloud hosted relational databases.

According to exemplary embodiments, the integrating module 424 may be configured to automatically integrate the user defined metric value of the plurality of cloud hosted relational databases with the cloud monitoring service. According to exemplary embodiments, the serverless function 506 is a programmatic function such that developers may not need to worry about underlying infrastructure on which the code will run. That is, the developers may not have to provision servers to run the serverless function and it would be taken care of by cloud providers. However, developers may still be responsible for maintenance of the code as it is owned by the corresponding developer.

According to exemplary embodiments, the cloud hosted relational databases may be of different types supported by different cloud providers.

According to exemplary embodiments, the user defined metrics provided by the user 502 may be cloud agnostic such that the serverless function 506 sends the user defined metrics for a cloud hosted relational database among the plurality of cloud hosted relational databases i.e., 412(1)-412 (n) (or Oracle database 510, MySql database 512), to the cloud monitoring service 403 (or monitoring service 514) in a database engine or provider agnostic manner such that user defined metrics can be implemented for any relational database engine or provider.

According to exemplary embodiments, the implementing module 416 may be further configured to implement only one serverless function 506 to fetch metrics of all relational databases (i.e., Oracle database 510 and MySql database 512) within a given cloud account thereby mitigating dependency of application teams from cloud provider for relational database metrics monitoring via the cloud monitoring service 403 (or monitoring server 514).

According to exemplary embodiments, the serverless function 506 may be a function that is configurable to run the codes of the configuration file to fetch the user defined metric values from the plurality of relational databases (i.e., database 412(1)-412 (n), Oracle database 510, MySql database 512, etc., but the disclosure is not limited thereto) and transmit the metric values to the cloud monitoring service 403 (or monitoring server 514) in a manner such that the user 502 of the serverless function 506 is only charged for an amount of resources of the plurality of relational databases (i.e., Oracle database 510 and MySql database 512) the user 502 utilizes in fetching the user defined metric values and for an amount of time for which the amount of resources are consumed.

For example, according to exemplary embodiments, the serverless function 506 may implement a lambda function to run the codes of the configuration file where infrastructure is managed by a cloud provider and the user is only be charged for an amount (i.e., dollar amount) of resources used. For example, the lambda function may be a serverless, event-driven compute service that lets the user 502 run code for virtually any type of application or backend service without provisioning or managing servers. For example, the user 502 may trigger the lambda function from over a plurality of cloud services and software as a service (SaaS) applications, and only pay for what the user 502 uses. That is, the code is executed based on the response of events in corresponding cloud services such as adding/removing files in a database.

According to exemplary embodiments, the implementing module 416 may be further configured to implement a rule that triggers the lambda function periodically after configured amount of time.

Referring back to FIG. 5, according to exemplary embodiments, a user 502, by utilizing a computing device may provide a configuration file, as disclosed above, to the serverless function 506. In response, the serverless function 506 may communicate with the cloud secrets provider 508 for updating Oracle connection string with a corresponding password. The cloud secrets provider 508 then returns the connection string with the corresponding password to the serverless function 506. In response, the serverless function 506 may communicate with the Oracle database 510 by executing query (i.e., MetricSqlQuery). In response, the Oracle database 510 may return a metrics configuration table (i.e., TABLE 1 as disclosed above) having a first column with metric name and another column with query to the serverless function 506. For example, each database engine (such Oracle, MS SqlServer, MySql, Postgres etc.) may provide Sql queries to fetch metrics values for various database system level metrics. Any business-related metrics can also be retrieved from database tables such as number of order placed, logged in users etc., via the Sql queries. Thus, metric value can be retrieved via SQL queries.

For example, as illustrated in FIG. 5, in the metrics configuration table returned by the Oracle database 510, the metric name column may include "number of orders placed" and the query column may include "select count (1) from orders." The "number of orders placed" may correspond to "closed_account_count". The "select count (1) from orders" may include: "select count (*) from dba_users where username in (*) account_status< >'OPEN". Thus, according to exemplary embodiments, upon receiving the metrics configuration table from the Oracle database 510, the serverless function 506 may select count (1) from orders, and as an example, the Oracle database 510 may return a value "30" to the serverless function 506. The serverless function 506 then send a request to the Oracle database 510 by utilizing the "select count (*) from dba_users where username in (*) account_status< >'OPEN'" query, and in response, the Oracle database 510 may return a value, i.e., "2", to the serverless function 506. The serverless function 506 may then push metrics (i.e., orders value "30" and account status open value "2") to the monitoring service 514.

According to exemplary embodiments, the serverless function 506 may then send a request to the cloud secrets provider 508 for updating MySql connection string with corresponding password, and in response, the could secrets provider 508 returns the connection string with the corresponding password to the serverless function 506. The serverless function 506 may then communicate with the MySql database 512 to execute metric Sql query, and in response, the MySql database 512 returns a metrics configuration table. Similar to the process above described with respect to the Oracle database 510, the serverless function 506 may communicate with the MySql database 512 for selecting count (1) from trades, and in response, the MySql database 512 may return a value, i.e., "300", to the serverless function. The serverless function 506 then send a request to the MySql database 512 by utilizing the "select count (*) from dba_users where username in (*) account_ status< >'OPEN'" query, and in response, the MySql database 512 may return a value, i.e., "1", to the serverless function 506. The serverless function 506 may then push both values (i.e., trades value "300" and account status open value "1") to the monitoring service 514.

It may be very common that an application may have more than one database and those can be of different kind such as Oracle, MySql etc. Thus, the code generated by the UDMIM 406 may take configuration as collection of Connection String and Corresponding MetricSqlQuery. Then the code may iterate through the collection and send metrics for all database to monitoring service. The code is database agnostic which means it can work with any relational database engine (i.e., MySql, SqlServer, Oracle, Postgres, etc.).

Figure 6:
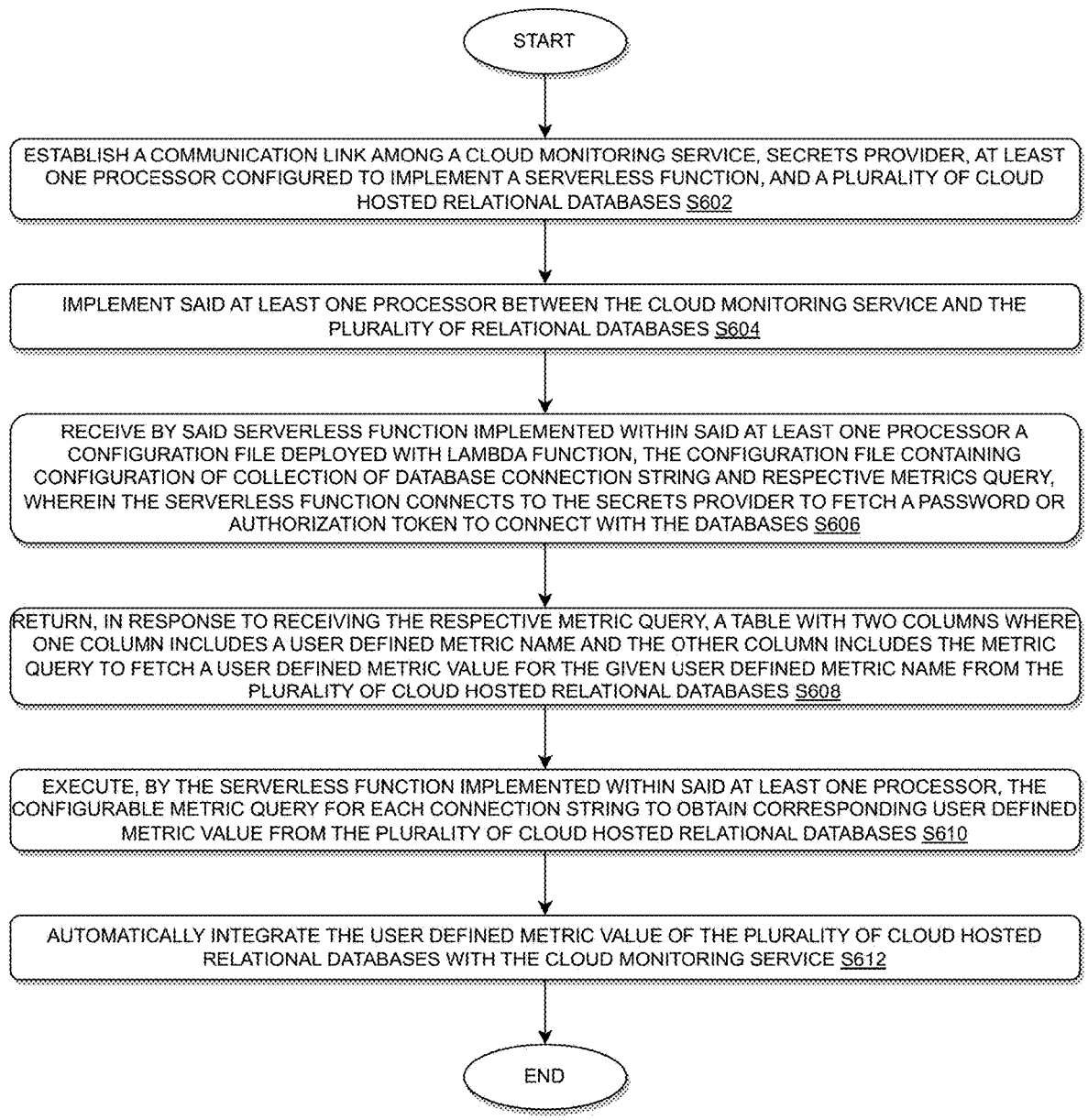
FIG. 6 illustrates an exemplary flow chart of a process implemented by the platform, language, database, and cloud agnostic user defined metrics integration module of FIG. 4 for integration of user defined metrics of cloud hosted relational databases with cloud monitoring services in accordance with an exemplary embodiment.

FIG. 6 illustrates an exemplary flow chart of a process 600 implemented by the platform, language, database, and cloud agnostic UDMIM 406 of FIG. 4 for integration of user defined metrics of cloud hosted relational databases with cloud monitoring services in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include establishing a communication link, via a communication network, among a cloud monitoring service, secrets provider, at least one processor configured to implement a serverless function, and a plurality of cloud hosted relational databases.

At step S604, the process 600 may include implementing said at least one processor between the cloud monitoring service and the plurality of relational databases.

At step S606, the process 600 may include receiving by the serverless function implemented within said at least one processor a configuration file deployed with lambda function, the configuration file containing configuration of collection of database connection string and respective metrics query, wherein the serverless function connects to the secrets provider to fetch a password or authorization token to connect with the databases.

At step S608, the process 600 may include returning, in response to receiving the respective metric query, a table with two columns where one column includes a user defined metric name and the other column includes the configurable metric query to fetch a user defined metric value for the given user defined metric name from the plurality of cloud hosted relational databases.

At step S610, the process 600 may include executing, by the serverless function implemented within said at least one processor, the metric query for each connection string to obtain corresponding user defined metric value from the plurality of cloud hosted relational databases.

At step S612, the process 600 may include automatically integrating the user defined metric value of the plurality of cloud hosted relational databases with the cloud monitoring service.

According to exemplary embodiments, in the process 600, the cloud hosted relational databases may be of different types supported by different cloud providers.

According to exemplary embodiments, in the process 600, the user defined metrics may be cloud agnostic such that the serverless function sends the user defined metrics for a cloud hosted relational database among the plurality of cloud hosted relational databases to the cloud monitoring servicer in a database engine or provider agnostic manner such that user defined metrics can be implemented for any relational database engine or provider.

According to exemplary embodiments, the process 600, may further include: implementing only one serverless function to fetch metrics of all relational databases within a given cloud account thereby mitigating dependency of application teams from cloud provider for relational database metrics monitoring via the cloud monitoring service.

According to exemplary embodiments, in the process 600, the serverless function may be a function that is configurable to run the codes of the configuration file to fetch the user defined metric values from the plurality of relational databases and transmit the metric values to the cloud monitoring service in a manner such that a user of the serverless function is only charged for an amount of resources of the plurality of relational databases the user utilizes in fetching the user defined metric values and for an amount of time for which the amount of resources are consumed.

According to exemplary embodiments, in the process 600, the serverless function may implement a lambda function to run the codes of the configuration file where infrastructure is managed by a cloud provider and the user is only be charged for an amount (i.e., dollar amount) of resources used.

According to exemplary embodiments, the process 600 may further include: implementing a rule that triggers the lambda function periodically after configured amount of time.

According to exemplary embodiments, the UDMID 402 may include a memory (e.g., a memory 106 as illustrated in FIG. 1) which may be a non-transitory computer readable medium that may be configured to store instructions for implementing a platform, language, database, and cloud agnostic UDMIM 406 for integrating user defined metrics of cloud hosted relational databases with cloud monitoring services as disclosed herein. The UDMID 402 may also include a medium reader (e.g., a medium reader 112 as illustrated in FIG. 1) which may be configured to read any one or more sets of instructions, e.g., software, from any of the memories described herein. The instructions, when executed by a processor embedded within the UDMIM 406, or within the UDMID 402, may be used to perform one or more of the methods and processes as described herein. In a particular embodiment, the instructions may reside completely, or at least partially, within the memory 106, the medium reader 112, and/or the processor 104 (see FIG. 1) during execution by the UDMID 402.

According to exemplary embodiments, the instructions, when executed, may cause a processor embedded within the UDMIM 406 or the UDMID 402 to perform the following: establishing a communication link, via a communication network, among a cloud monitoring service, secrets provider, at least one processor configured to implement a serverless function, and a plurality of cloud hosted relational databases: implementing said at least one processor between the cloud monitoring service and the plurality of relational databases; receiving by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases; returning, in response to receiving the respective metrics query, a table with two columns where one column includes a user defined metric name and the other column includes the metric query to fetch a user defined metric value for the given user defined metric name from the plurality of cloud hosted relational databases; executing, by the serverless function implemented within said at least one processor, the configurable metric query for each connection string to obtain corresponding user defined metric value from the plurality of cloud hosted relational databases; and automatically integrating the user defined metric value of the plurality of cloud hosted relational databases with the cloud monitoring service. According to exemplary embodiments, the processor may be the same or similar to the processor 104 as illustrated in FIG. 1 or the processor embedded within UDMID 202, UDMID 302, UDMID 402, and UDMIM 406, 506.

According to exemplary embodiments, the instructions, when executed, may cause the processor 104 to further perform the following: implementing only one serverless function to fetch metrics of all relational databases within a given cloud account thereby mitigating dependency of application teams from cloud provider for relational database metrics monitoring via the cloud monitoring service.

According to exemplary embodiments, the instructions, when executed, may cause the processor 104 to further perform the following: implementing a rule that triggers the lambda function periodically after configured amount of time.

According to exemplary embodiments as disclosed above in FIGS. 1-6, technical improvements effected by the instant disclosure may include a platform for implementing a platform, language, database, and cloud agnostic user defined metrics integration module configured to integrate user defined metrics of cloud hosted relational databases with cloud monitoring services, but the disclosure is not limited thereto. According to exemplary embodiments as disclosed above in FIGS. 1-6, technical improvements effected by the instant disclosure may include a platform for implementing a platform, language, database, and cloud agnostic user defined metrics integration module configured to send user defined metrics for a cloud hosted relational database in a database engine/provider agnostic manner such that it can work for any relational database engine: implement one serverless function to fetch metrics of all relational databases within a given cloud account: mitigate the dependency of application teams from cloud provider for relational database metrics monitoring via cloud monitoring services, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating user defined metrics of cloud hosted relational databases with cloud monitoring services by utilizing one or more processors along with allocated memory, the method comprising:
    establishing a communication link, via a communication network, among a cloud monitoring service, a secrets provider, at least one processor configured to implement a serverless function, and a plurality of cloud hosted relational databases;
    implementing said at least one processor between the cloud monitoring service and the plurality of relational databases;
    receiving by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases;
    returning, in response to receiving the respective metrics query, a table with two columns where one column includes a user defined metric name and the other column includes the metric query to fetch a user defined metric value for the given user defined metric name from the plurality of cloud hosted relational databases;
    executing, by the serverless function implemented within said at least one processor, the configurable metric query for each connection string to obtain corresponding user defined metric value from the plurality of cloud hosted relational databases; and
    automatically integrating the user defined metric value of the plurality of cloud hosted relational databases with the cloud monitoring service.

2. The method according to claim 1, wherein said cloud hosted relational databases are of different types supported by different cloud providers.

3. The method according to claim 2, wherein the user defined metrics are cloud agnostic such that the serverless function sends the user defined metrics for a cloud hosted relational database among the plurality of cloud hosted relational databases to the cloud monitoring servicer in a database engine or provider agnostic manner such that user defined metrics can be implemented for any relational database engine or provider.

4. The method according to claim 3, further comprising:
    implementing only one serverless function to fetch metrics of all relational databases within a given cloud account thereby mitigating dependency of application teams from cloud provider for relational database metrics monitoring via the cloud monitoring service.

5. The method according to claim 3, wherein the serverless function is a function that is configurable to run the codes of the configuration file to fetch the user defined metric values from the plurality of relational databases and transmit the metric values to the cloud monitoring service in a manner such that a user of the serverless function is only charged for an amount of resources of the plurality of relational databases the user utilizes in fetching the user defined metric values and for an amount of time for which the amount of resources are consumed.

6. The method according to claim 5, wherein the serverless function implements a lambda function to run the codes of the configuration file where infrastructure is managed by a cloud provider and the user is only be charged for an amount of resources used.

7. The method according to claim 6, further comprising:
    implementing a rule that triggers the lambda function periodically after configured amount of time.

8. A system for integrating user defined metrics of cloud hosted relational databases with cloud monitoring services, the system comprising:
    a processor; and
    a memory operatively connected to the processor via a communication interface, the memory storing computer readable instructions, when executed, causes the processor to:
    establish a communication link, via a communication network, among a cloud monitoring service, a secrets provider, at least one processor configured to implement a serverless function, and a plurality of cloud hosted relational databases;
    implement said at least one processor between the cloud monitoring service and the plurality of relational databases;
    receive by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases;
    return, in response to receiving the respective metrics query, a table with two columns where one column includes a user defined metric name and the other column includes the metric query to fetch a user defined metric value for the given user defined metric name from the plurality of cloud hosted relational databases;
    execute, by the serverless function implemented within said at least one processor, the configurable metric query for each connection string to obtain corresponding user defined metric value from the plurality of cloud hosted relational databases; and
    automatically integrate the user defined metric value of the plurality of cloud hosted relational databases with the cloud monitoring service.

9. The system according to claim 8, wherein said cloud hosted relational databases are of different types supported by different cloud providers.

10. The system according to claim 9, wherein the user defined metrics are cloud agnostic such that the serverless function sends the user defined metrics for a cloud hosted relational database among the plurality of cloud hosted relational databases to the cloud monitoring servicer in a database engine or provider agnostic manner such that user defined metrics can be implemented for any relational database engine or provider.

11. The system according to claim 10, the processor is further configured to:
implement only one serverless function to fetch metrics of all relational databases within a given cloud account thereby mitigating dependency of application teams from cloud provider for relational database metrics monitoring via the cloud monitoring service.

12. The system according to claim 10, wherein the serverless function is a function that is configurable to run the codes of the configuration file to fetch the user defined metric values from the plurality of relational databases and transmit the metric values to the cloud monitoring service in a manner such that a user of the serverless function is only charged for an amount of resources of the plurality of relational databases the user utilizes in fetching the user defined metric values and for an amount of time for which the amount of resources are consumed.

13. The system according to claim 12, wherein the serverless function implements a lambda function to run the codes of the configuration file where infrastructure is managed by a cloud provider and the user is only be charged for an amount of resources used.

14. The system according to claim 13, the processor is further configured to:
implement a rule that triggers the lambda function periodically after configured amount of time.

15. A non-transitory computer readable medium configured to store instructions for integrating user defined metrics of cloud hosted relational databases with cloud monitoring services, the instructions, when executed, cause a processor to perform the following:
establishing a communication link, via a communication network, among a cloud monitoring service, a secrets provider, at least one processor configured to implement a serverless function, and a plurality of cloud hosted relational databases;
implementing said at least one processor between the cloud monitoring service and the plurality of relational databases;
receiving by said serverless function implemented within said at least one processor a configuration file deployed with lambda function, the configuration file containing configuration of collection of database connection string and respective metrics query, wherein the serverless function connects to the secrets provider to fetch a password or authorization token to connect with the databases;
returning, in response to receiving the respective metrics query, a table with two columns where one column includes a user defined metric name and the other column includes the metric query to fetch a user defined metric value for the given user defined metric name from the plurality of cloud hosted relational databases;
executing, by the serverless function implemented within said at least one processor, the configurable metric query for each connection string to obtain corresponding user defined metric value from the plurality of cloud hosted relational databases; and
automatically integrating the user defined metric value of the plurality of cloud hosted relational databases with the cloud monitoring service.

16. The non-transitory computer readable medium according to claim 15, wherein said cloud hosted relational databases are of different types supported by different cloud providers.

17. The non-transitory computer readable medium according to claim 16, wherein the user defined metrics are cloud agnostic such that the serverless function sends the user defined metrics for a cloud hosted relational database among the plurality of cloud hosted relational databases to the cloud monitoring servicer in a database engine or provider agnostic manner such that user defined metrics can be implemented for any relational database engine or provider.

18. The non-transitory computer readable medium according to claim 17, wherein the instructions, when executed, further cause the processor to perform the following:
implementing only one serverless function to fetch metrics of all relational databases within a given cloud account thereby mitigating dependency of application teams from cloud provider for relational database metrics monitoring via the cloud monitoring service.

19. The non-transitory computer readable medium according to claim 17, wherein the serverless function is a function that is configurable to run the codes of the configuration file to fetch the user defined metric values from the plurality of relational databases and transmit the metric values to the cloud monitoring service in a manner such that a user of the serverless function is only charged for an amount of resources of the plurality of relational databases the user utilizes in fetching the user defined metric values and for an amount of time for which the amount of resources are consumed.

20. The non-transitory computer readable medium according to claim 19, wherein the serverless function implements a lambda function to run the codes of the configuration file where infrastructure is managed by a cloud provider and the user is only be charged for an amount of resources used.

* * * * *